United States Patent

Kukimoto

[11] Patent Number: 5,119,857
[45] Date of Patent: Jun. 9, 1992

[54] PNEUMATIC RADIAL TIRES INCLUDING SHOULDER RECESSES

[75] Inventor: Takashi Kukimoto, Kodaira, Japan

[73] Assignee: Bridgestone Corporation, Tokyo, Japan

[21] Appl. No.: 469,692

[22] Filed: Jan. 25, 1990

Related U.S. Application Data

[63] Continuation of Ser. No. 194,612, May 16, 1988, abandoned.

[30] Foreign Application Priority Data

May 15, 1987 [JP] Japan ............... 62-117162

[51] Int. Cl.$^5$ ............................................. B60C 11/01
[52] U.S. Cl. .................................. 152/454; 152/523; 152/209 R
[58] Field of Search ............ 152/209 R, 209 A, 209 D, 152/209 B, 454, 456, 523, 208

[56] References Cited

U.S. PATENT DOCUMENTS

| | | | |
|---|---|---|---|
| 2,760,541 | 8/1956 | Reifenberger | 152/209 R |
| 3,057,390 | 10/1962 | Pattison, Jr. et al. | 152/209 R |
| 3,450,182 | 6/1969 | Verdier | 152/209 R |
| 4,214,618 | 7/1980 | Takigawa et al. | 152/209 D |
| 4,798,236 | 1/1989 | Fujiwara | 152/209 R |

FOREIGN PATENT DOCUMENTS

| | | | |
|---|---|---|---|
| 0019070 | 11/1980 | European Pat. Off. | |
| 1143070 | 2/1969 | United Kingdom | 152/209 R |

Primary Examiner—Geoffrey L. Knable
Attorney, Agent, or Firm—Sughrue, Mion, Zinn, Macpeak & Seas

[57] ABSTRACT

A pneumatic radial tire capable of preventing the occurrence of uneven wear due to lateral force produced in the cornering is provided with a recess formed in at least one-side tread shoulder opening toward the side face of the tire and continuously extending circumferentially of the shoulder and has particular ratios of tire thickness to sidewall thickness and distance between deepest position of recession and equator of tire to distance between ground contact end of tread and equator of tire.

4 Claims, 4 Drawing Sheets

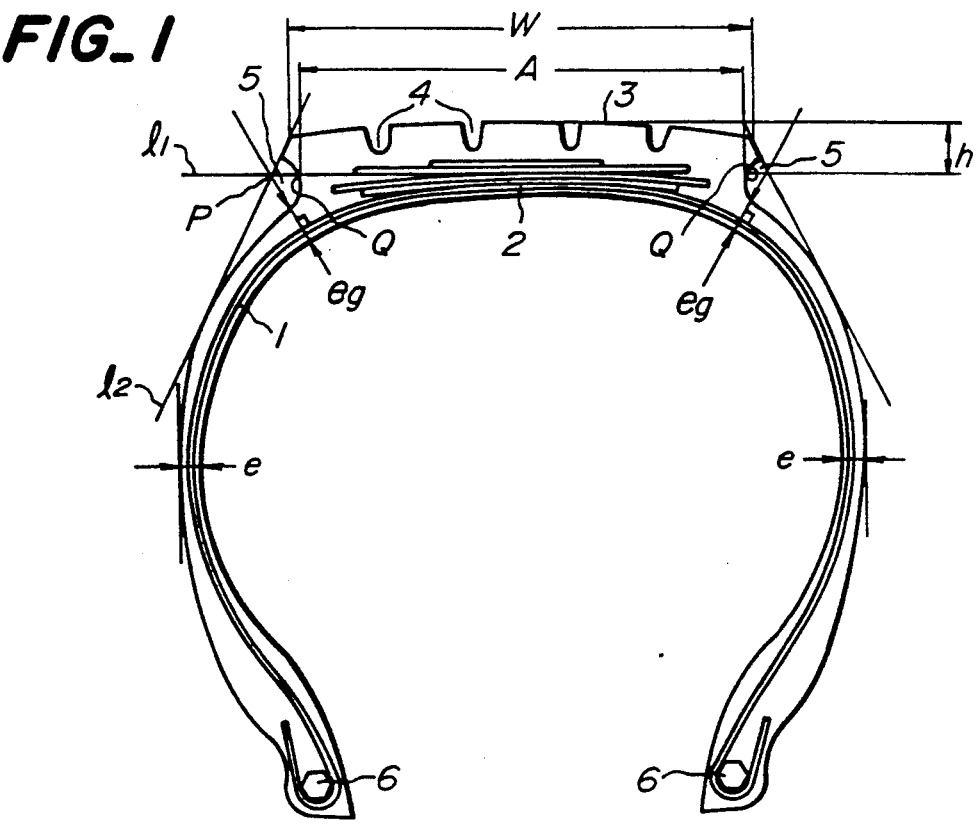
FIG_1
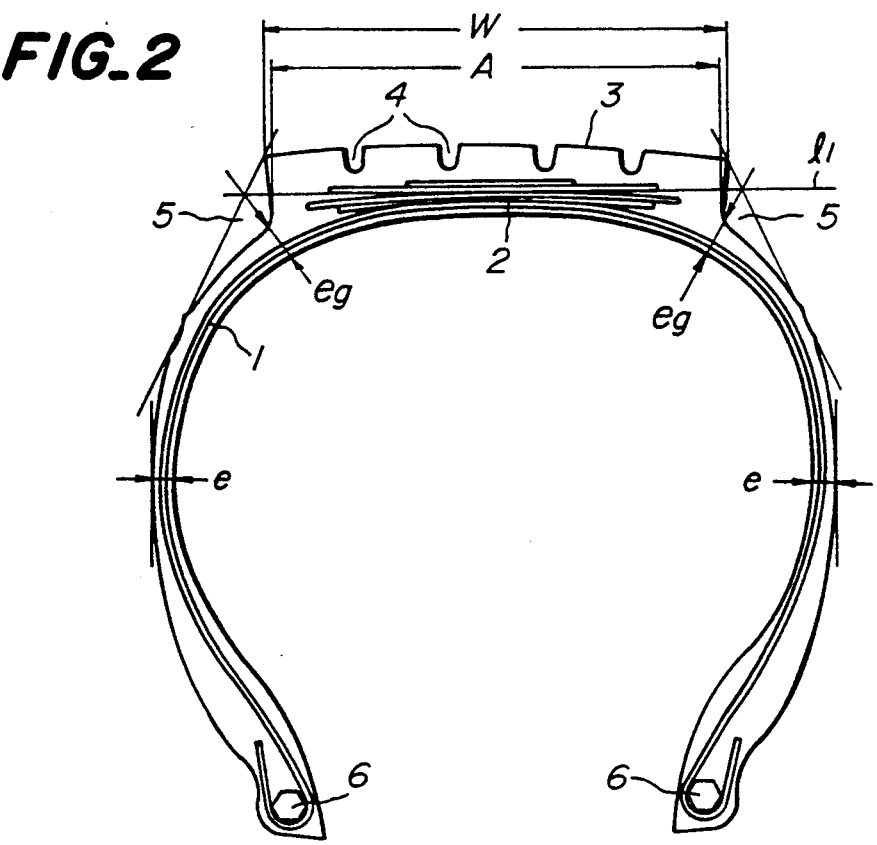
FIG_2

FIG_8a
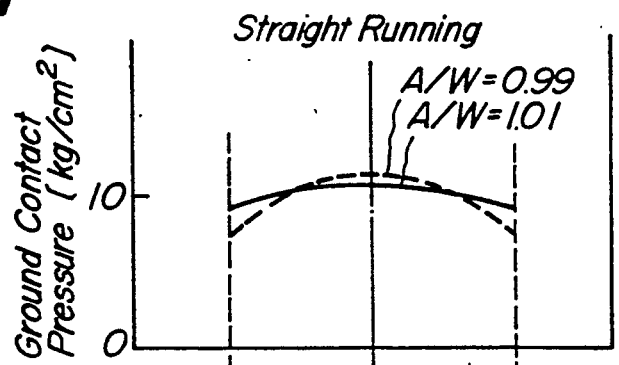
FIG_8b
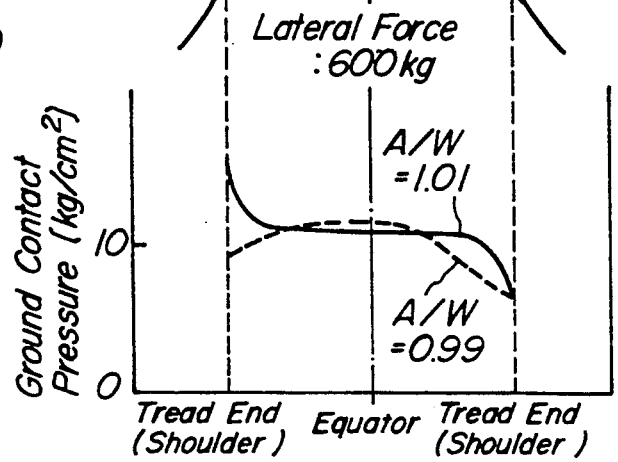
FIG_9a
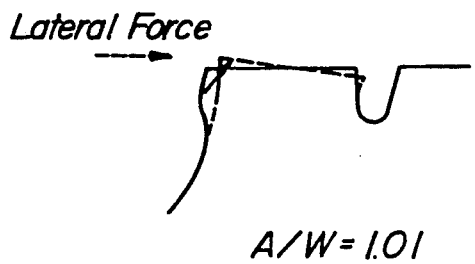
A/W = 1.01
FIG_9b
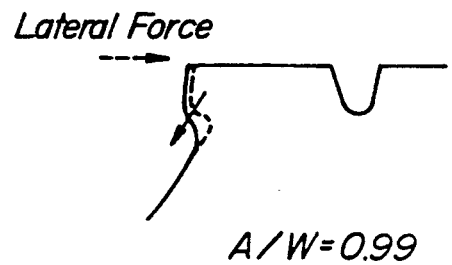
A/W = 0.99

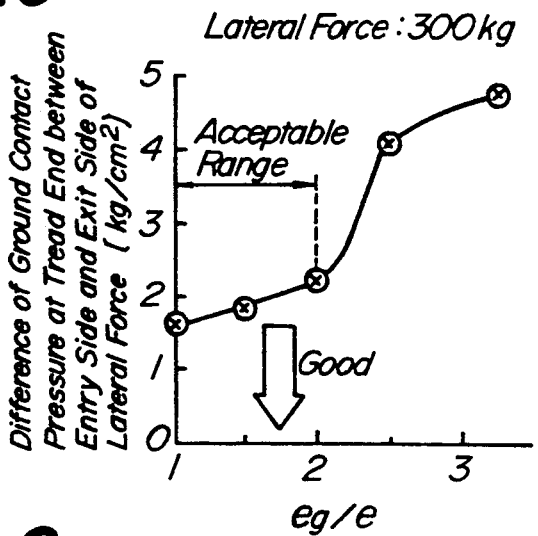
FIG_5
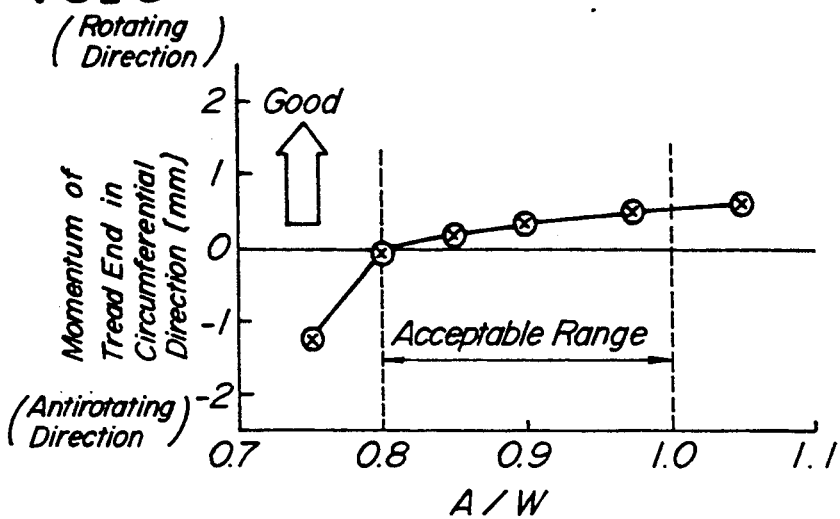
FIG_6
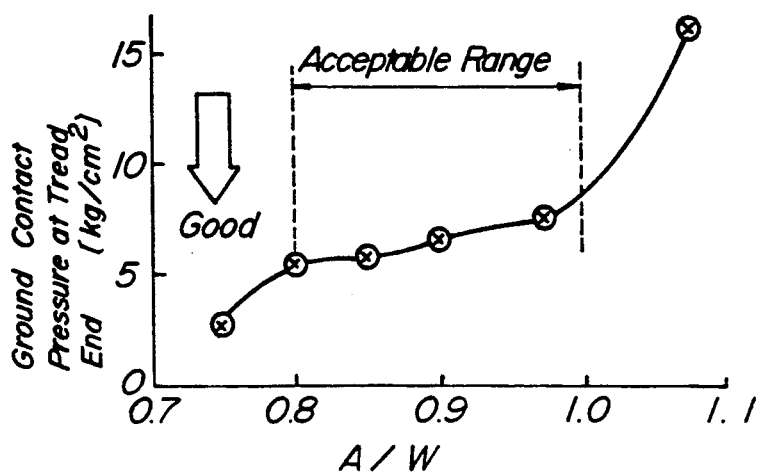
FIG_7

PNEUMATIC RADIAL TIRES INCLUDING SHOULDER RECESSES

This is a continuation of application Ser. No. 07/194,612 filed May 16, 1988 now abandoned.

BACKGROUND OF THE INVENTION

1. Field of the Invention

This invention relates to pneumatic radial tires, and more particularly to a pneumatic radial tire which can suppress local wear of tire tread due to lateral forces produced in the cornering or the like of the tire.

2. Related Art Statement

For instance, in the tire mounted on a front wheel shaft of a vehicle, wear of an outward tread portion at the mounted state is faster as compared with that of the other portion due to the lateral force produced in the cornering. Thus, uneven wear begins to occur in such a fast worn portion as the tire goes on, and finally the durable life of the tire becomes shortened.

As a countermeasure for solving the problem of the abovementioned uneven wear, there have been attempted a method of controlling the rigidity distribution of tread rubber by changing the tread pattern or the kind of rubber used, a method of controlling the lateral force in the cornering by changing the outer profile of the tread, and the like. However, the effect of preventing uneven wear can not be maintained up to the last stage of the tire life by these methods, so that the conventional techniques do not come to fundamentally solve the above problem.

Furthermore, the technique for solving the problem of uneven wear is disclosed in U.S. Pat. No. 4,214,618 and EP-A-19,070. However, these techniques have problems on the thickness of the sidewall portion near the shoulder of the tread and the formation of a recess with respect to the tread width, and particularly they are not sufficient to prevent uneven wear due to the lateral force in the cornering.

In any case, it is particularly important to eliminate the deviation of the wearing rate in the tread surface starting from the initial stage of the running for fundamentally preventing the occurrence of uneven wear.

SUMMARY OF THE INVENTION

It is an object of the invention to provide a pneumatic radial tire which can eliminate the uneven wear in cornering without causing a phenomenon that the shoulder region of the tread is dragged toward the center region of the tread in straight running or the occurrence of uneven wear in the shoulder region in the straight running by bearing the lateral force produced in the cornering or the like with the whole surface of the tread.

According to the invention, in order to have the tire uniformly wear starting from the initial stage of the running, the ground contacting property of the tire is uniform when the tire is subjected to lateral force in the cornering, that is, the rubber gauge of the shoulder adjoining to the tread end is thinned to decrease the bending rigidity in the widthwise direction of the tread. Thus, rising of the tread at an output side of the lateral force is suppressed. While, a recession is formed in the side face of the shoulder to restrain the collapsing of rubber at the tread end, whereby the ground contact pressure is reduced to prevent the stress concentration in the tread end at an entry side of the lateral force (outside region of the tread). That is, in the invention, the ground contact pressure of the tread in the cornering is uniform between both the shoulders by the combination of the rubber gauge in the sidewall portion and the formation of the recession to suppress the premature wearing of the tread end portion. Furthermore, when the tire is on an inclination face of a rutted road, the lateral force produced at the tread end is reduced by the influence of the inclination face to prevent a so-called wondering phenomenon and contribute to the improvement of straight running stability.

That is, the invention provides a pneumatic radial tire comprising a tread provided with plural main grooves extending circumferentially of the tread and reinforced with a carcass ply and a belt composed of at least two metal cord layers, characterized in that a recess opening toward the side face of the tire is formed in at least one shoulder region of the tread and continuously extends along the periphery of this shoulder, and a ratio of tire thickness $e_g$ to sidewall thickness e in at least one side of radial section of the tire is within a range of $1 \sim 2$ (wherein, $e_g$ is a tire thickness on a normal line drawn to the carcass from an intersection P between a straight line $l_1$ passing through a center of the belt thickness at the equator of the tire and in parallel with the rotational axis of the tire and a straight line $l_2$ passing through the tread end and coming into contact with the sidewall, and e is a sidewall thickness at a position corresponding to the maximum width of the tire), and a distance (a) from a deepest position Q of the recess in a direction of the rotational axis to the equatorial plane is shorter than a distance (w) from a ground contact end of the tread to the equatorial plane.

BRIEF DESCRIPTION OF THE DRAWINGS

FIGS. 1 to 3 are schematically sectional views of embodiments of the pneumatic radial tire according to the invention;

FIG. 5 is a graph showing a relation between thickness ratio ($e_g/e$) and difference of ground contact pressure at tread end;

FIG. 6 is a graph showing a relation between ratio of distance between deepest positions of recessions to distance between tread ends (A/W) and momentum of tread end in circumferential direction;

FIG. 7 is a graph showing a relation between the ratio A/W and ground contact pressure at tread end;

FIGS. 8a and 8b are graphs showing a relation between the ratio A/W and ground contact pressure in the straight running and the cornering, respectively; and FIGS. 9a and 9b are schematic views showing the deformation of tread shoulder at given value of the ratio A/W, respectively.

DESCRIPTION OF THE PREFERRED EMBODIMENTS

Figure 3:
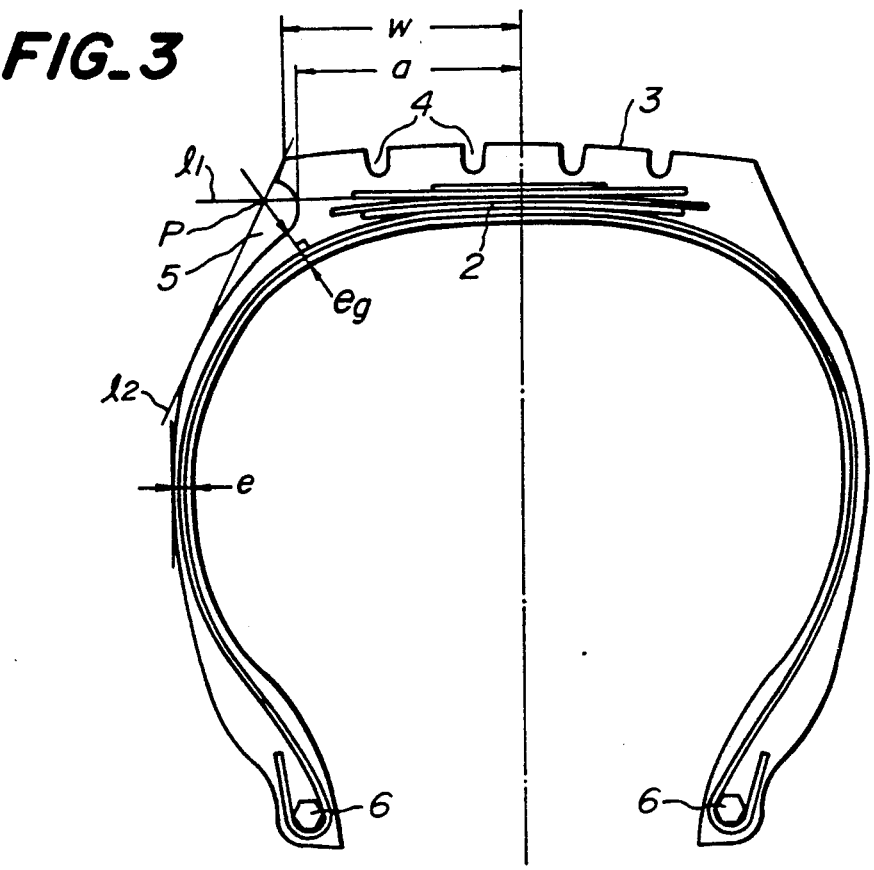

In FIG. 1 is schematically shown a first embodiment of the pneumatic radial tire according to the invention, wherein numeral 1 is a carcass composed of a single carcass ply in the illustrated embodiment, numeral 2 a belt composed of four metal cord layers, wherein the second and third layers viewed from the carcass 1 constitute the main body of the belt, numeral 3 a tread, numeral 4 main grooves extending circumferentially of the tread 3, numeral 5 a recess opening toward a side face of a tire shoulder region adjoining to the tread end, and numeral 6 bead cores.

In FIG. 1, P is an intersection between a straight line $l_1$ passing between the second layer and the third layer of the belt 2 and in parallel with the rotational axis of the tire and a straight line $l_2$ passing through the tread end and coming into contact with the sidewall (or tangential line to sidewall). According to the invention, the thickness of the tire casing is set to satisfy a relation of $1 \leq e_g/e \leq 2$, wherein $e_g$ is a tire thickness on a normal line drawn from the intersection P to the carcass 1 and e is a thickness of a sidewall at a position corresponding to the maximum width of the tire.

In FIG. 1, A is a distance between deepest positions of the recesses 5 in the widthwise direction of the tread 3, that is, two times of a distance (a) between the deepest position of the recess 5 and the equatorial plane of the tire. According to the invention, the distance A is set to be within a range of not less than 80% but less than 100% of the tread width W (i.e. two times of a distance (w) between the ground contact end of the tread and the equatorial plane of the tire).

Moreover, h is a distance between the deepest position Q of the recession 5 and the ground contact face of the tread 3. In the invention, the distance h is set to be at least larger than the depth of the main groove 4.

FIG. 2 is a modified embodiment of the pneumatic radial tire shown in FIG. 1. That is, the shape of the recession 5 is different from that of FIG. 1. Furthermore, FIG. 3 shows another embodiment of the pneumatic tire according to the invention, wherein the recess 5 is formed only in one-side of the shoulder region of the tread. In the latter case, it is favorable that the tire is mounted on the wheel rim to direct the shoulder region containing the recession outward from the vehicle.

Figure 4:
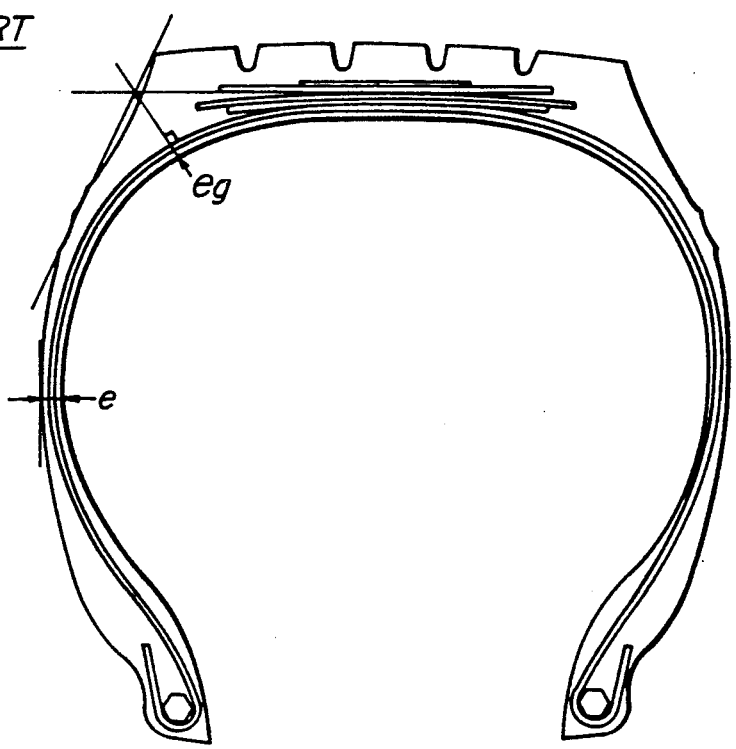
FIG. 4 is a schematically sectional view of the conventional radial tire.

According to the inventor's analysis, when the tire is deformed by the lateral force produced in cornering, in the conventional tire as shown in FIG. 4, since the bending rigidity near the tread shoulder is high, the bending deformation is caused in the vicinity of the tread shoulder as a whole to raise the ground contact pressure at an entry side of the lateral force, which is apt to more cause the wearing, while the tread surface rises up from the road surface at an exit side of the lateral force to lose the action of bearing the lateral force. By such a mechanism, the wearing difference is produced between the tread center and the vicinity of the shoulder at an initial running stage, whereby the difference in diameter between the tread center and the shoulder is caused in the straight running to drag the tread shoulder toward the tread center, so that the uneven wear is further accelerated at a middle running stage. On the other hand, in the pneumatic radial tire according to the invention, the bending rigidity near the tread shoulder is lowered to cause the shearing deformation of the tire, whereby the difference in the bearing action against the lateral force is reduced between the entry side of the lateral force and the exit side thereof to lessen the change of distribution of ground contact pressure in the tire tread as a whole.

As an evaluation for the ground contacting property in the input of the lateral force, the measurement for the difference of ground contact pressure between both tread ends was performed by varying $e_g/e$ under a lateral force of 300 kg. The measured results are shown in FIG. 5. As seen from FIG. 5, the very good ground contacting property is obtained when $e_g/e$ is not more than 2. On the other hand, when $e_g/e$ is less than 1, the durability at the tread end degrades. Therefore, the ratio $e_g/e$ is limited to a range of 1~2. Thus, the change of ground contact pressure distribution from the straight running to the cornering. i.e. change of ground contact pressure distribution produced by the deformation of the tire due to the input of the lateral force is controlled and also the ground contact pressure of the shoulder itself can be reduced to decrease the absolute value of the ground contact pressure at the entry side of the lateral force in the cornering. Furthermore, the phenomenon of dragging the shoulder toward the tread center in the straight running does not occur because the difference in diameter between the tread center and the shoulder is not produced.

Moreover, the momentum of tread end in the circumferential direction thereof and the ground contact pressure were examined by varying a distance A between deepest positions of the recesses formed in both tread shoulders to the tread width W (ground contact width between the tread ends) to obtain results as shown in FIGS. 6 and 7. As seen from FIGS. 6 and 7, it is advantageous that a ratio of A/W is not less than 0.8 but less than 1 in order to satisfy the above properties.

As shown by a solid line in FIGS. 8a and 8b, when A>W (A/W=1.01), the ground contact pressure distribution becomes smooth between the both shoulders in the straight running (FIG. 8a), but cornering or when the lateral force of 600 kg is applied to the tire (FIG. 8b), the ground contact pressure extremely concentrates in the entry and exit sides of the lateral force. This leads to the occurrence of uneven wear in the shoulder at the initial running stage. On the other hand, when W>A (A/W=0.99), as shown by dotted lines in FIGS. 8a and 8b, there is not caused the concentration of ground contact pressure into the shoulder in the input of the lateral force. Such phenomena are produced by a mechanism as shown in FIGS. 9a and 9b. That is, when A>W, as shown in FIG. 9a, the shoulder deforms from a solid line (before the input of lateral force) to dotted lines (after the input of lateral force) in an arrow direction because rubber is non-compressive and does not change the volume thereof. As a result, the tread end is shifted outward in the radial direction by the input of the lateral force to concentrate the ground contact pressure in the tread end. On the contrary, when A<W, as shown in FIG. 9b, the volume of the tread end can be escaped inward in the radial direction as shown by an arrow, so that there is no concentration of ground contact pressure in the shoulder.

Furthermore, when a distance h between the deepest position of the recession and the ground contact surface of the tread is smaller than the depth of the main groove, the effect of the recession reduces as the wearing at the tread surface proceeds. Finally the effect is lost on and after the middle running stage. Therefore, it is advantageous that the distance h is set to be at least larger than the depth of the main groove.

The invention will be described in detail with reference to the following example.

A test tire having a tire size of 10.00 R20 was manufactured according to the structure shown in FIG. 1. In this case, the dimensions of the test tire are shown in the following Table 1 as Examples 1 and 2. Furthermore, the conventional tire shown in FIG. 4 was provided as Comparative Example 1, while a test tire having A>W and provided at its shoulder with a recession was manufactured as Comparative Example 2.

Each of these tires was actually run under the following test conditions to obtain test results as shown in Table 1.

vehicle: flat body truck (wheel type 2-D4)
load: 100%
rim: 7.00T 20
internal pressure: 7.25 kg/cm$^2$
route: 70% expressway - 30% general road (paved road)
speed: 80km/hr at expressway, 40km/hr at general road
running distance: 80,000 km
mounting position of tire: test tire was mounted on a front wheel and the tire rotation between vehicles was performed every distance of 10,000 km.

TABLE 1

|  | Example 1 | Example 2 | Comparative Example 1 | Comparative Example 2 |
|---|---|---|---|---|
| Tire size | 1000R20 | 1000R20 | 1000R20 | 1000R20 |
| W (mm) | 190 | 190 | 190 | 190 |
| A (mm) | 180 | 188 | no recession | 192 |
| A/W | 0.95 | 0.99 | — | 1.01 |
| Thickness $e_g$ (mm) | 13 | 13.5 | 25.2 | 13.5 |
| Thickness e (mm) | 9 | 9 | 9 | 9 |
| $e_g/e$ | 1.4 | 1.5 | 2.8 | 1.5 |
| Depth of main groove (mm) | 13 | 13 | 13 | 13 |
| h (mm) | 18 | 18 | — | 18 |
| Wear resistance[1] (km/mm) | 15,349 | 14,937 | 12,726 | 14,281 |
| Width of uneven wear (mm) | 8 | 15 | 28 | 28 |
| Depth of uneven wear (mm) | 1 | 1.5 | 3.6 | 2.7 |
| Straight running stability[2] | 110 | 108 | 100 | 103 |

[1] running distance till the tread was worn to a thickness of 1 mm
[2] so-called wondering characteristic was evaluated by the feeling of a driver. It was represented by an index on the basis that the conventional tire was 100.

As mentioned above, in the pneumatic radial tire according to the invention, the difference in the tread bearing the lateral force produced in the cornering can be uniformed to enhance the ground contacting property of the tire, whereby the improvement of the wear resistance, particularly uneven wear resistance can be realized.

What is claimed is:

1. A pneumatic radial tire comprising: a tread provided with plural main grooves extending circumferentially of the tread and reinforced with a radial carcass ply and a belt, said belt composed of at least two metal cord layers, a recess opening toward a side face of the tire formed in both shoulder regions of the tread and continuously extending circumferentially along the periphery of said shoulder, a ratio $e_g/e$ in at least one side of radial section of the tire having said recess within a range of 1 to 2, where $e_g$ is a tire thickness on a normal line drawn to the carcass from an intersection P between a straight line $l_1$ passing through a center of the belt thickness at the equator of the tire and in parallel with the rotational axis of the tire and a straight line $l_2$ passing through the tread end and tangent to the sidewall, and e is a sidewall thickness at a position corresponding to the maximum width of the tire, a deepest position of the recess in a direction of the rotational axis of the tire being under a ground contact end of the tread, said belt having a width in a direction of said rotational axis not extending beyond said recess, and wherein a distance (A) between deepest positions of recesses formed at both shoulders in the axial direction of the tire is not less than 80% of a ground contact width of the tread (W).

2. The pneumatic radial tire according to claim 1, wherein said ratio eg/e is within a range of 1 to 2 at both sides in the radial section of the tire.

3. The pneumatic radial tire according to claim 1, wherein a distance between deepest positions of said recesses formed at both shoulders in the axial direction of the tire is smaller than a ground contact width of the tread.

4. The pneumatic radial tire according to claim 1, wherein a distance (h) from the surface of the tread at the equator to the deepest position of a recess in the axial direction of the tire is larger than a depth of said main groove in said tread.

* * * * *